UNITED STATES PATENT OFFICE.

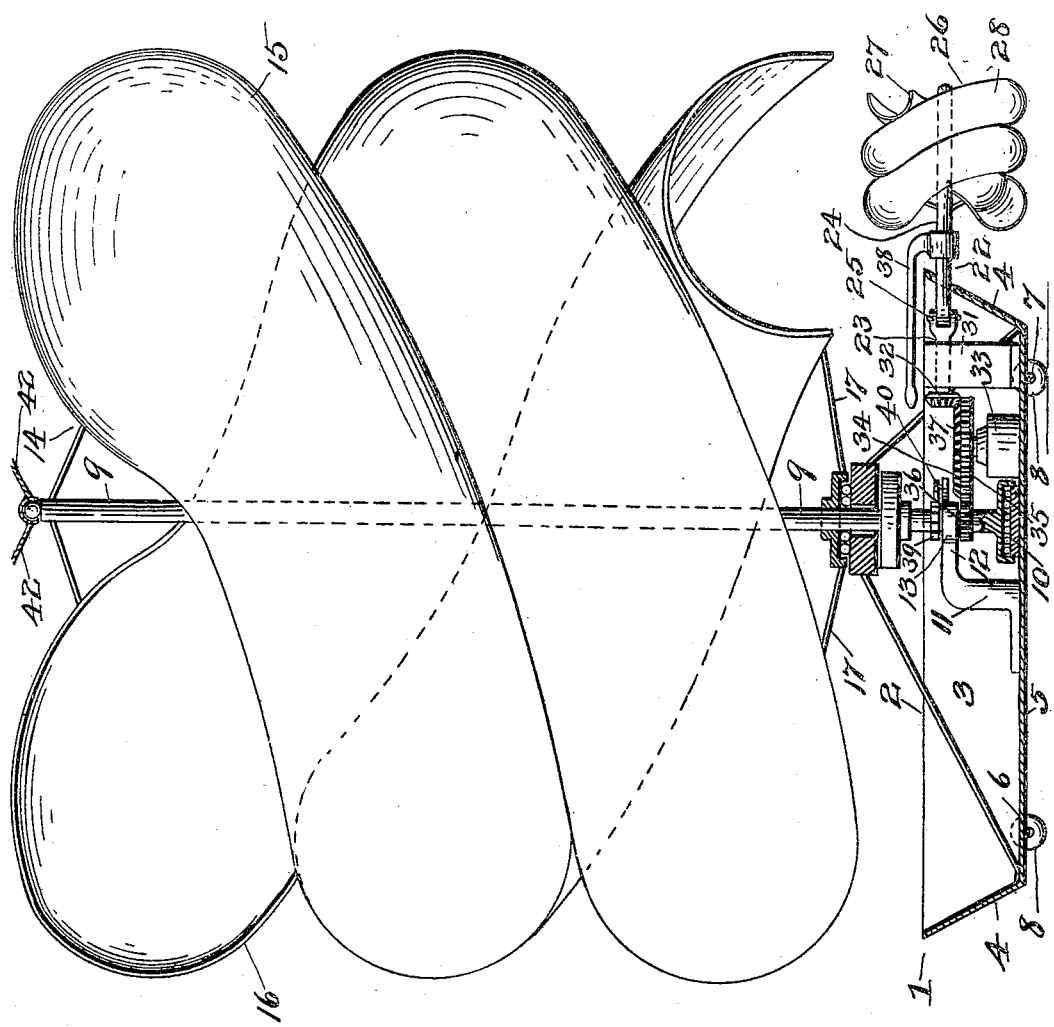

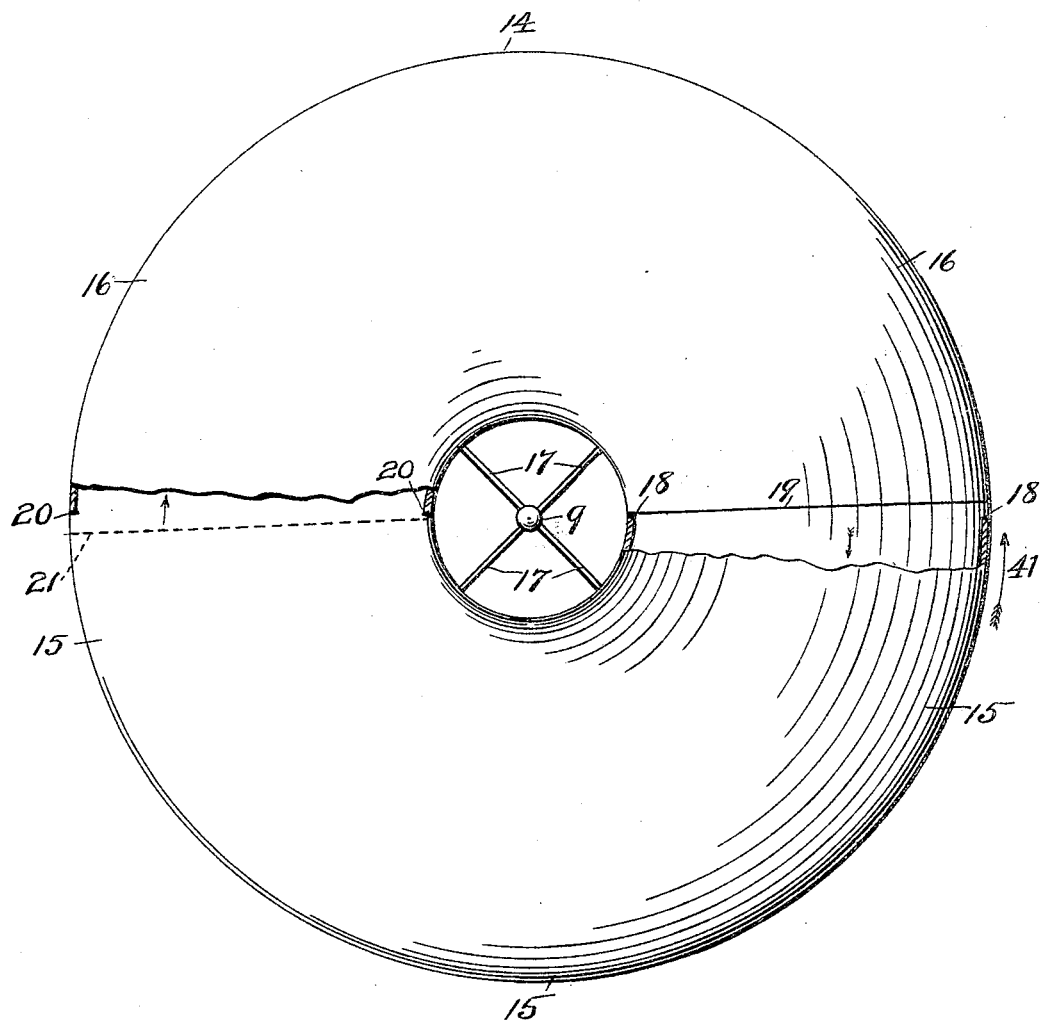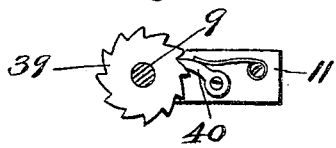

JOHN M. JONES, OF NEW YORK, N. Y., ASSIGNOR TO THE WORLD'S AERIAL TRANSPORTATION COMPANY, A CORPORATION, OF WASHINGTON, DISTRICT OF COLUMBIA.

PROPELLER.

No. 801,321.  Specification of Letters Patent.  Patented Oct. 10, 1905.

Application filed June 30, 1904. Serial No. 214,825.

*To all whom it may concern:*

Be it known that I, JOHN M. JONES, a citizen of the United States, residing at New York city, in the county of New York and State of New York, have invented certain new and useful Improvements in Propellers, of which the following is a specification.

My invention relates to improvements in propellers, more especially for use in aerial navigation and designed to be used in connection with an air-ship; but it may be used equally as well for other purposes where motive power is desired.

It is well known that reliable and efficient sustaining means which does not depend on a gas-bag or other similar flotation means, aeroplanes or kites, and propelling means for an air-ship or other body has been sought after for some time in the science of aerial navigation, and the lack of means for performing such functions has been one of the greatest obstacles in the way of the successful navigation of the air.

My invention has for its object to overcome the disadvantages heretofore met with in aerial navigation by providing efficient motive power for propelling vehicles or other bodies either in the air or on land or on or under the water, and more especially to provide means for causing the ascent and descent, propelling, guiding, and maintaining automatically the equilibrium of an air-ship without reference to the direction of the wind.

A further object is to provide sustaining and propelling means which is simple, light, inexpensive, and strong in construction, very durable, convenient and safe, easily operated with a minimum amount of driving power, and producing a maximum amount of propelling power.

My invention consists in the construction, combination, and arrangement of the several parts, as more fully hereinafter described and claimed.

Figure 3:
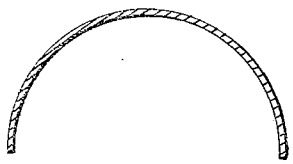
Figure 4:
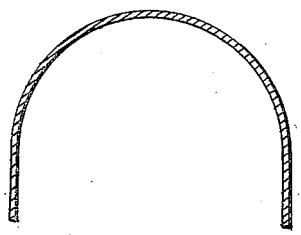
Figure 5:
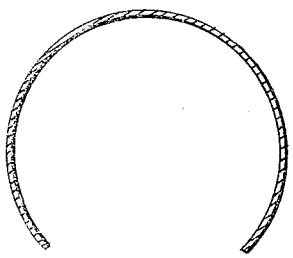
Figure 6:
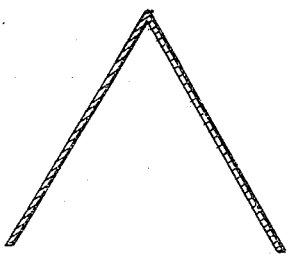
Figure 7:
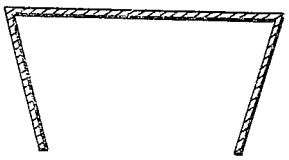
Figure 8:
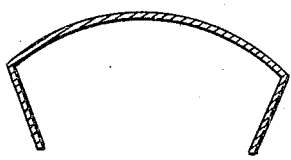
Figure 9:
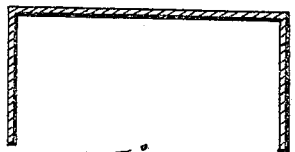
Figure 10:
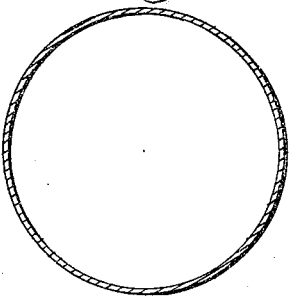

Referring to the drawings illustrating my invention, Figure 1 is a side view, partly in section, of my invention applied to an air-ship; Fig. 2, a top plan view; Fig. 3, a cross-section of one of the semitubular members of the propeller; Figs. 4, 5, 6, 7, 8, 9, and 10, cross-sectional views of various modified forms of the propeller; Fig. 11, a top plan view of the ratchet and pawl for preventing the vertical propeller from moving backward.

In the drawings, in which like numerals of reference denote like parts throughout the several views, 1 represents an air-ship, the body portion 2 of which is preferably made of aluminium; but it may be made of any other material, said body portion comprising sides 3, ends 4, and a bottom 5, provided with axles 6 and 7, having wheels 8. Said wheels 8 are for use when it is desired to propel the air-ship along the ground instead of elevating and propelling it in the air. The body portion of the air-ship is properly weighted or ballasted by the means of the weight of the motor or engine and the occupant or occupants of said body portion. A shaft 9 rises vertically from the bottom of the body portion and is made of steel or other suitable material and provided with a ball-bearing 10 or any other strong bearing at the lower end.

11 is a bracket secured to the bottom 5 and provided with a horizontally-extending arm 12 at its upper portion, having a bearing 13.

14 is the propeller for causing the ascent and descent of the air-ship, provided with two semitubular spiral members 15 and 16, each of which is the counterpart of the other, and secured rigidly to the shaft 9 by means of suitable braces 17. Each member of the propeller is preferably constructed of aluminium, but may be constructed of steel, tin, sheet-iron, brass, zinc, canvas, or any other suitable material. The semitubular spiral member 15 starts at the point 18, (see Fig. 2,) which is the mouth or inlet end of the same, and curves downward spirally just about once around the shaft 9 and terminates at point 19, which is the outlet end. The semitubular spiral member 16 starts at the point 20, (see Fig. 2,) which is the mouth or inlet end of the same, and curves downward spirally about once around the shaft 9 in a reverse direction to the semitubular member 15 and terminates at point 21, which is the outlet end.

It will be seen that the mouth or receiving end of the semitubular spiral member 15 is on the same plane as the mouth of the semitubular spiral member 16 and that they face in opposite directions, while the outlet ends of the semitubular spiral members are situated below the inlet ends and are on the same plane and face in opposite directions. Although the outlet end of the tubular spiral member is shown terminating nearly in the same plane as the inlet end, it may terminate before it reaches said inlet end or be extended beyond the same.

22 is a horizontal shaft made in two parts 23 and 24, which are coupled by being pivoted together at point 25. The outer end of the shaft 22 is provided with a propeller 26 for the purpose of propelling and steering the air-ship in a horizontal direction after the propeller 14 has lifted it to the desired elevation or to propel the ship on or under the water or on land when it is not desired to elevate the same in the air.

The propeller 26 is made much smaller than the propeller 14; but the construction is exactly the same, 27 and 28 being the two semitubular members and 29 braces for the same.

The part 23 of the shaft 22 is journaled in a vertical bearing 31, and 32 is a bevel-pinion on the inner end of said part 23 of the shaft.

33 is a motor or engine of any well-known type mounted on the bottom of the air-ship for driving the propellers 14 and 26 and designed to be operated by electricity, steam, gasolene, compressed or liquid air or other power.

34 is a large gear-wheel mounted on the shaft 35 of the motor, said gear-wheel provided with straight gear-teeth 35$^a$, which mesh with a small pinion 36 on the shaft 9, and with bevel gear-teeth 37, which mesh with the bevel-pinion 32 on part 23 of shaft 22.

38 is a lever attached to the part 24 of shaft 22 for the purpose of providing means for moving said shaft and the propeller 26 laterally to guide or steer the air-ship. Any suitable means may be used for clamping the lever so as to hold the propeller 26 in any desired position.

Although I have shown one propeller with two semitubular spiral members for accomplishing the ascent and descent of the air-ship and one propeller for propelling the same, the number of propellers may be increased and the number of semitubular spiral members on said propellers may be increased or decreased, as may be found desirable.

A propeller or propellers may be used at the front of the air-ship or other vehicle at any desired angle for the purpose of drawing and also controlling the direction of the movement of the same.

The object of the semitubular spiral shape of the members of the propellers is to receive, confine, and compress the air therein and cause it to bear continuously on the inner surface of said members, and thereby produce a very powerful lifting power.

The propeller is prevented from turning backward by a ratchet 39, secured to the shaft 9, and a spring-pawl 40, pivoted on the bracket 11.

42 represents ropes or cables designed to be connected to a gas-field.

The operation is as follows: The motor is started, which through the medium of the gears drives the shafts 9 and 22 and operates the propellers 14 and 26 simultaneously. The semitubular spiral members of the propeller being rotated, preferably in the direction of the arrow 41, causes air to enter the mouths of the same with great velocity and be compressed or condensed against the inner surface and given a downward spiral movement and finally to pass out at the opposite end, which will produce a lifting action which will cause the air-ship to ascend to the height desired, and the propeller 26 will cause the same to be propelled in any direction. When it is desired to descend, all that is necessary to do is to reduce the speed of the motor, which in turn will reduce the speed of the propellers and allow the air-ship to descend gradually until it reaches the ground. The rapidity of the ascent and descent and the height of the air-ship in the air are regulated by the speed of the propeller 14.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is—

1. A propeller provided with members having chambers the under portions of which are open, substantially as described.

2. A propeller provided with semitubular chambers the under portions of which are open, substantially as described.

3. A propeller provided with semitubular spiral chambers the under portions of which are open from end to end, substantially as described.

4. A propeller provided with members having semitubular chambers open from end to end, substantially as described.

5. A propeller provided with semitubular air-receiving members having their inlet ends facing in opposite directions in the same plane and their outlet ends facing in opposite directions in the same plane, substantially as described.

6. A propeller provided with semitubular members having their inlet ends facing in opposite directions in the same horizontal plane and their outlet ends facing in opposite directions in the same horizontal plane, the under portions of said members being open from end to end, substantially as described.

7. A vehicle provided with a propeller for lifting, and propellers for operating said vehicle in a substantially horizontal direction, each provided with members having continuous spiral semitubular chambers, said chambers being open from end to end, and means for operating said propellers, substantially as described.

8. A vehicle provided with a horizontal shaft, a shaft pivoted to the same provided with semitubular chambers open from end to end, a handle for moving said pivoted shaft laterally, and a vertically-arranged propeller operatively connected to said horizontal shaft, substantially as described.

9. A propeller provided with members curving spirally around each other, said members having their under portions open, substantially as described.

10. A propeller provided with a shaft with semitubular members open at their under portions and curved spirally around the same, one of said members curved in the reverse direction from the other member, substantially as described.

In testimony whereof I affix my signature in the presence of two witnesses.

JOHN M. JONES.

Witnesses:
FRED. P. HINKEL,
WALTER O. BLACKWOOD.